United States Patent [19]
Eck et al.

[11] Patent Number: 5,916,972
[45] Date of Patent: Jun. 29, 1999

[54] MATERIAL HAVING TEMPERATURE-DEFENDANT LIGHT TRANSMISSION

[75] Inventors: Wolfgang Eck, Bad Krozingen; Hans-Joachim Cantow; Volker Wittwer, both of Freiburg, all of Germany

[73] Assignee: BASF Aktiengesellschaft, Ludwigshafen, Germany

[21] Appl. No.: 08/766,467

[22] Filed: Dec. 12, 1996

Related U.S. Application Data

[63] Continuation of application No. 08/460,832, Jun. 5, 1995, abandoned, which is a continuation of application No. 08/229,338, Apr. 12, 1994, abandoned, which is a continuation of application No. 08/022,270, Feb. 25, 1993, abandoned.

[30]  Foreign Application Priority Data

Feb. 29, 1992 [DE] Germany ............... 42 06 317

[51] Int. Cl.⁶ ................................................. C08L 33/14
[52] U.S. Cl. .................. 525/223; 525/191; 525/205; 525/207; 525/216; 525/227; 525/241
[58] Field of Search ................... 525/223, 241, 525/216, 227, 191, 205, 207

[56] References Cited

U.S. PATENT DOCUMENTS

| 4,722,506 | 2/1988 | Chang ....................................... 248/670 |
| 4,881,798 | 11/1989 | Yuasa et al. ............................. 350/353 |
| 5,047,481 | 9/1991 | Siol et al. ................................ 525/216 |
| 5,104,954 | 4/1992 | Mueller ................................ 526/307.7 |

FOREIGN PATENT DOCUMENTS

| 3426476 | 4/1986 | Germany . |
| 3436477 | 4/1986 | Germany . |
| 3545892 | 7/1986 | Germany . |

Primary Examiner—E. Rollins Buffalow
Attorney, Agent, or Firm—Antonelli, Terry, Stout, & Kraus, LLP

[57]  ABSTRACT

Disclosed are mixtures of two or more polymers of which at least one is cross-linked. Interpenetrating polymer networks are on hand. The polymers mix below a certain temperature and demix above this temperature (LCST behavior). Below the demixing temperature, such interpenetrating polymer networks are optically clear, above the demixing temperature they are milky, turbid and have reduced light transmission due to the light scattering of the phaseseparated system' if the refractive indices of the components do not coincide. The demixing process is fully reversible below the demixing temperature.

12 Claims, 3 Drawing Sheets

MATERIAL HAVING TEMPERATURE-DEFENDANT LIGHT TRANSMISSION This application is a continuation application of Ser. No. 08/460,832, filed Jun. 5, 1995, now abandoned which is a continuation of application Ser. No. 08/229,338 filed Apr. 12, 1994 (now abandoned), which is a continuation of application Ser. No. 08/022,270, filed Feb. 25, 1993 (now abandoned).

BACKGROUND OF THE INVENTION

The present invention relates to a material having temperature-dependent light transmission.

Materials of this type are, by way of illustration, utilized as protection against overheating: above the turbidity temperature, a substrate (e.g. solar collectors, house walls, etc.) lying under the mixture is protected against further warming up due to incident radiation (visible light, UV, IR radiation).

Further applications of materials of this type are temperature-dependent darkening, temperature indication as well as temperature and wavelength-dependent radiation filters as the light transmission is wavelength-dependent in the state of turbidity.

SUMMARY OF THE INVENTION

The object of the present invention is, in particular, to provide a class of material having temperature-dependent light transmission, by means of which large surfaces can be coated inexpensively with a material having temperature-dependent light transmission.

A solution in accordance with the present invention is attained by providing the material with a mixture of at least two polymers, of which at least one is cross-linked, that mix below a certain temperature and demix above this temperature.

An element of the present invention is that interpenetrating polymer networks are employed. The polymers are mixed below a certain temperature and demix above this temperature (LCST bebavior).

Below the demixing temperature, such interpenetrating polymer networks are optically clear; above the demixing temperature they are milky, turbid and demonstrate reduced light transmission due to the light scattering of the phase-separated system if the refractive indices of the components do not coincide. The demixing process is fully reversible below the demixing temperature.

Hitherto this effect of demixing polymer systems above a certain temperature is known almost solely in uncrosslinked polymer systems. In such systems, the demixing is not fully reversible or only very slowly so due to unrestricted phase growth above the demixing temperature. The demixing and mixing cannot be infinitely repeated and the material cannot be kept infinitely in the demixed state without detriment to the reversibility of the process. Uncrosslinked polymer mixtures creep (flow) at raised temperatures and therefore demonstrate poor mechanical stability. To the best of the inventor's knowledge in the literature there is only one known example of LCST behavior with interpenetrating networks (Polymer Preprints 1989, 30(1), 111) without, however, any mention of a reversibility of the demixing.

The invented materials have a number of advantages over such uncrosslinked polymer systems:

The mentioned demixing process is quick and fully reversible; i.e. after cooling below the demixing temperature, turbidity disappears completely within a short period. The demixing and mixing process can be repeated infinitely and the material can be kept in the demixed state infinitely without any changes in the reversibility and the other properties of the material.

Phase growth during demixing can be limited and the size of the phases in the demixed state can be directly controlled, permitting regulating the degree of turbidity in the demixed state.

The rate of the demixing and mixing process can be altered.

The breadth of the temperature range in which turbidity occurs can be regulated.

The mixture indicates no creep even at a raised temperature. It, therefore, does not require a carrier substance to retain its mechanical stability.

These new properties of the mixture are obtained, in particular, by the following measures:

The key measure is cross-linking of at least one component of the polymer mixture. Thus the mixture can be called an interpenetrating, or in the event only one component is cross-linked, a semi-interpenetrating network. This measure restricts the growth of the phases during the turbid state, regulates their size and permits in this manner the rapid reversibility of the demixing and prevents creeping of the material.

Furthermore, the above-mentioned new properties of the mixture are determined in an advantageous manner by the following measures:

It is particularly advantageous if a part of the not cross-linked component(s) (referred hereinafter to as mobile component(s)) is grafted to the cross-linked component(s). This facilitates mixing of the separated phases.

The size of the phases in the demixed state is determined by the cross-link density; small cross-link density yields larger phases and greater turbidity.

The rate of demixing and mixing is influenced by:

a) the difference between the turbidity temperature and the glass temperature of the mixture; increasing the difference raises the rate. In order to obtain a high mixing rate, the glass temperature should be at least 500, preferably 1000 below the turbidity temperature.

b) the ratio of mobile component(s) in the mixture; an increase in the ratio raises the rate.

c) the ratio of mobile component(s) grafted to the cross-linked component(s); an increase in the degree of grafting raises the rate.

d) the cross-link density; larger cross-link density yields smaller phase dimensions and less turbidity in the demixed state and, therefore, more rapid mixing upon cooling.

e) the selection of mobile component(s); larger mobility (i.e. lower glass temperature, less molecular weight and less viscosity) raises the rate.

The breadth of the temperature range, in which turbidity occurs, can be influenced by the cross-link density; larger cross-link density extends the range. Lowering the cross-link density permits obtaining a rather distinct turbidity temperature.

The turbidity temperature can also rise due to great cross-linking density.

In the event one or more components of the mixture are copolymers, the breadth of the temperature range enlarges in which an increase in turbidity is detected, with growing chemical ununiformity of the copolymers. Chemical ununiformity means the occurrence of different copolymer molecules containing a varying percentage of different comonomers.

Furthermore, the turbidity temperature of the mixture can be varied by the mixing ratio of the components or, in the event one or more components are copolymers, by the percentile composition of the copolymers. With increased molecular-weight of the mobile component(s), the turbidity temperature sinks. The chemical nature of the components, of course, plays the decisive role for the miscibility and the position of the turbidity temperature.

DETAILED DESCRIPTION OF THE INVENTION

In the following section, the present invention will first be illustrated schematically using a binary mixture as an example:

Two polymers A and B form with each other hydrogen bonds:

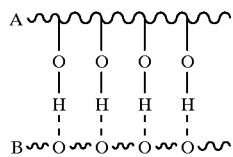

Polymers A and B mix at room temperature and demix above a certain temperature. Demixing can be symbolized by breaking up the hydrogen bonds. The more hydrogen bonds are formed between the polymers, the higher is the demixing temperature. Hydrogen bonds are, however, not an essential feature of the present invention; other mechanisms contributing to compatibility are also possible such as ionic interactions or intramolecular repulsion in copolymers.

Special Measures of the Present Invention

Crosslinking of polymer A:

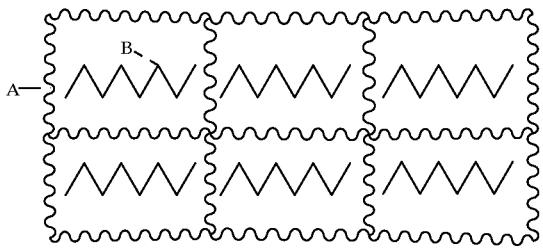

if need be, partial grafting of polymer B onto network A:

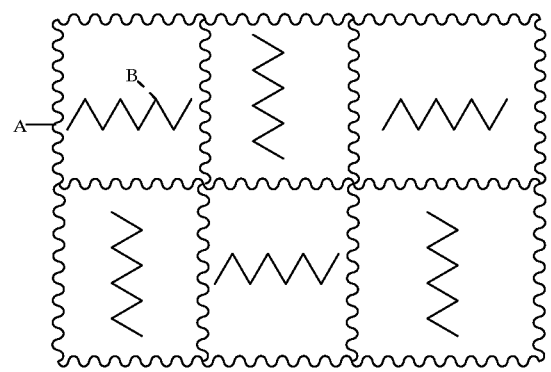

This will be made more apparent in the following using a specific example:

Polymer A: copolymer of styrene and hydroxyethyl methacrylate (HEMA)

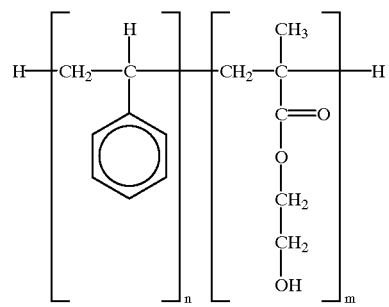

Polymer B: polypropylene oxide

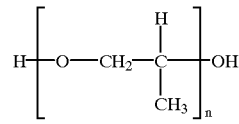

Polymer A is cross-linked by a trifunctional isocyanate, with polymer B being simultaneously grafted onto network A, e.g.

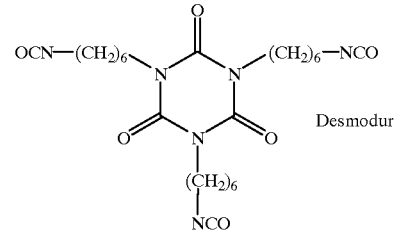

Desmodur N 3300 (Bayer AG)

The grafting of polymer B can be prevented in this example by blocking the hydroxyl groups at the ends of the polymer chains (e.g. by means of esterification) so that pure, non-grafted (semi-) interpenetrating polymer networks are created.

FABRICATION EXAMPLE 1 g of styrene and hydroxethyl methacrylate (molecular weight (Mw=100000, HEMA content: 6 mol %), 1 g of polypropylene oxide (Mw=4000) and 20mg of Desmodur N 3300 (Bayer AG) are dissolved in 5 ml of toluene, the mixture is put into a Petri dish and heated 16 h in a vacuum to 70° C. Yielded is a clear film which suddenly turns whitish and turbid upon being heated to 80° C. Upon cooling the film becomes completely clear again. The mixing and demixing process can be repeated infinitely.

Figure 1:
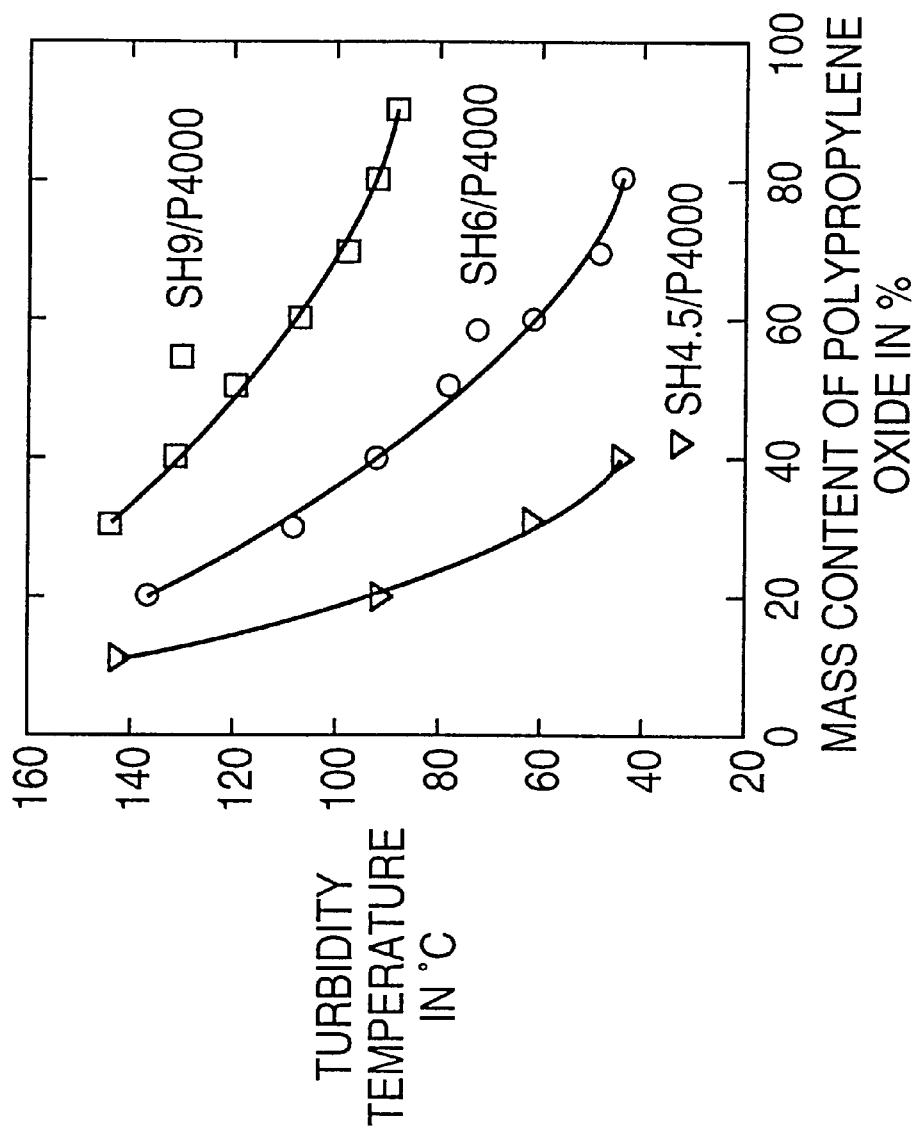
FIG. 1 is a diagram showing turbidity temperature as a function of amount of Propylene oxide, for a Polymer mixture according to the present invention.

The phase diagram of FIG. 1 is an example of the ability to control the turbidity temperature in the mixtures made according to the above-described method having the prescribed content of cross-linking agent.

SHx stands for styrene-HEMA copolymer (Mw=100.000) with x mol-% of HEMA. P4000 stands for polypropylene oxide Mw 4000. The turbidity temperature may be increased by raising the HEMA content of the copolymer or by lowering the polypropylene oxide content of the cross-linked mixture.

Figure 2:
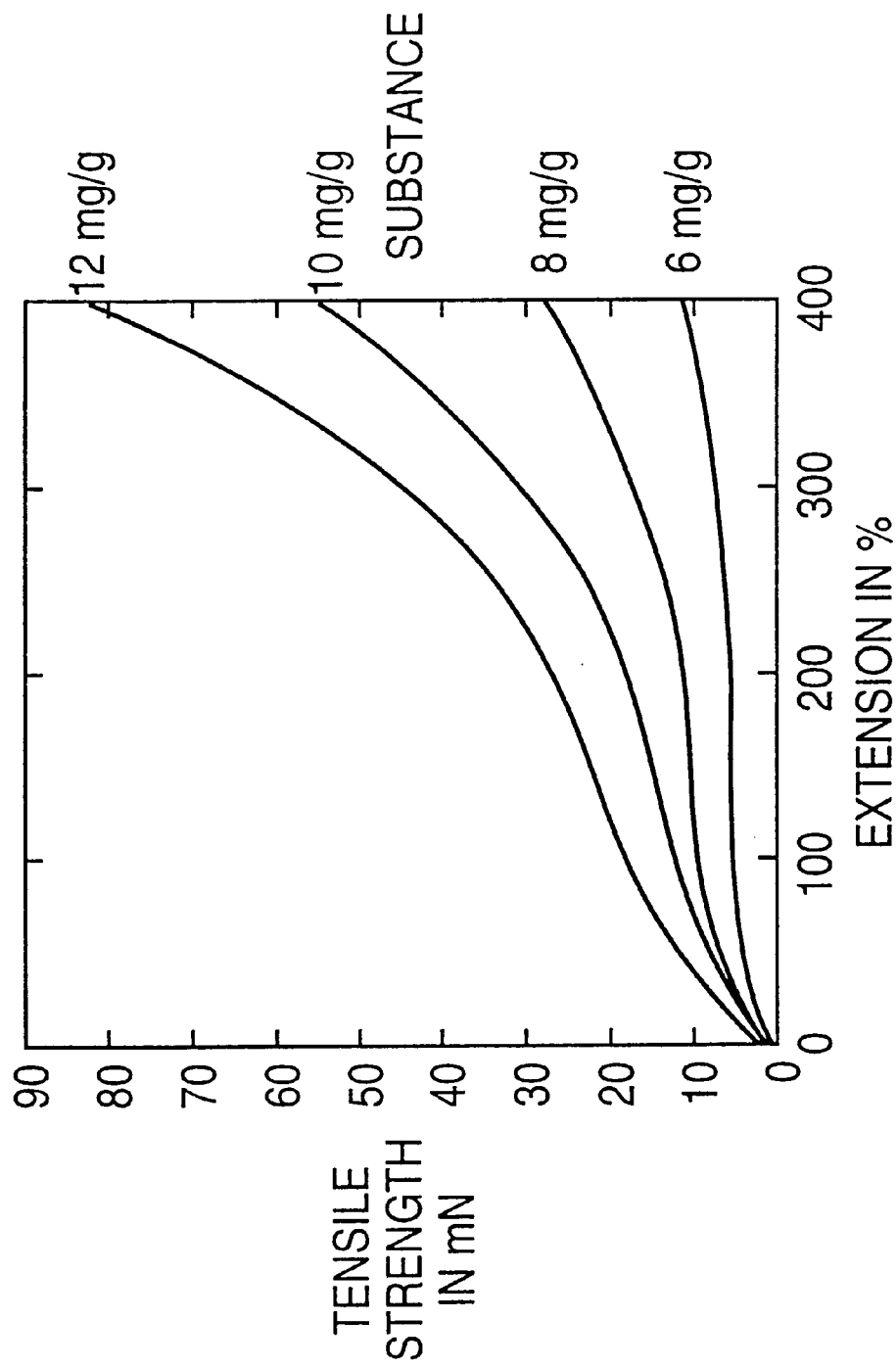
FIG. 2 is a diagram showing the effect on creep, of cross-linking a mixture of polymers.

The diagram of FIG. 2, yielded by stress-strain measurements, shows that cross-linking the mixture prevents creeping as is required for a long-lasting function (measured on an Instron 4204, film size: 20mm×4 mm×1 mm).

On the right beside the curves are the amounts of the cross-linking agent (Desmodur N 3300) per gram of the substance made according to the above-described method. The samples show typical rubber elastic behavior; there is no creep even if the amount of the cross-linking component is small.

Further Examples of Fabrication 1. 1 g of phenoxy PKHH (Union Carbide Corp.), 23 mol % of whose hydroxy groups had been acetylized by means of a reaction with acetic anhydride/pyridine, 1 g of polyvinyl methyl ether (Mw=20 000) and 40mg of ECN 1299 (Epoxy-Cresol-Novolac, Ciba-Geigy AG) as cross-linking agent is dissolved in 6ml of tetrahydrofuran. After dissolving 10 mg of 1,4-diazabicy-clo(2,2,2,)octane as cross-linking catalyst, the mixture is poured into a Petri dish, first a major part of the solvent is evaporated at 200 mbar and 25° C. and the mixture is heated at 200 mbar to 75° C. for 40 hours. Yielded is a transparent film which turns whitishly turbid upon being heated to 92° C. Upon cooling, the film becomes completely clear again. In this case too, demixing and mixing can be infinitely repeated.

2. 1g of polyvinyl phenol (MW 30 000, Polysciences), 1 g of poly-butyl acrylate (Mw=21 000, Mn=12 000 determined by gel permeation chromatography in toluene against polystyrene standards), 30 mg of ECN 1299 (Ciba-Geigy AG) as cross-linking agent and 10 mg of 1,4-diazabicyclo (2,2,2)-octane are dissolved in 6 ml of tetrahydrofuran and poured into a Petri dish. First a major part of the solvent is evaporated at 200 mbar and 25° C. and then the mixture is heated at 20 mbar to 75° C. for 24 hours. Yielded is a transparent film which suddenly turns whitishly turbid upon being heated to 87° C. and completely clear again upon cooling. Demixing and mixing can be infinitely repeated, and the system can be retained infinitely in the demixed state without any change in the reversibility or any other properties of system.

Figure 3:
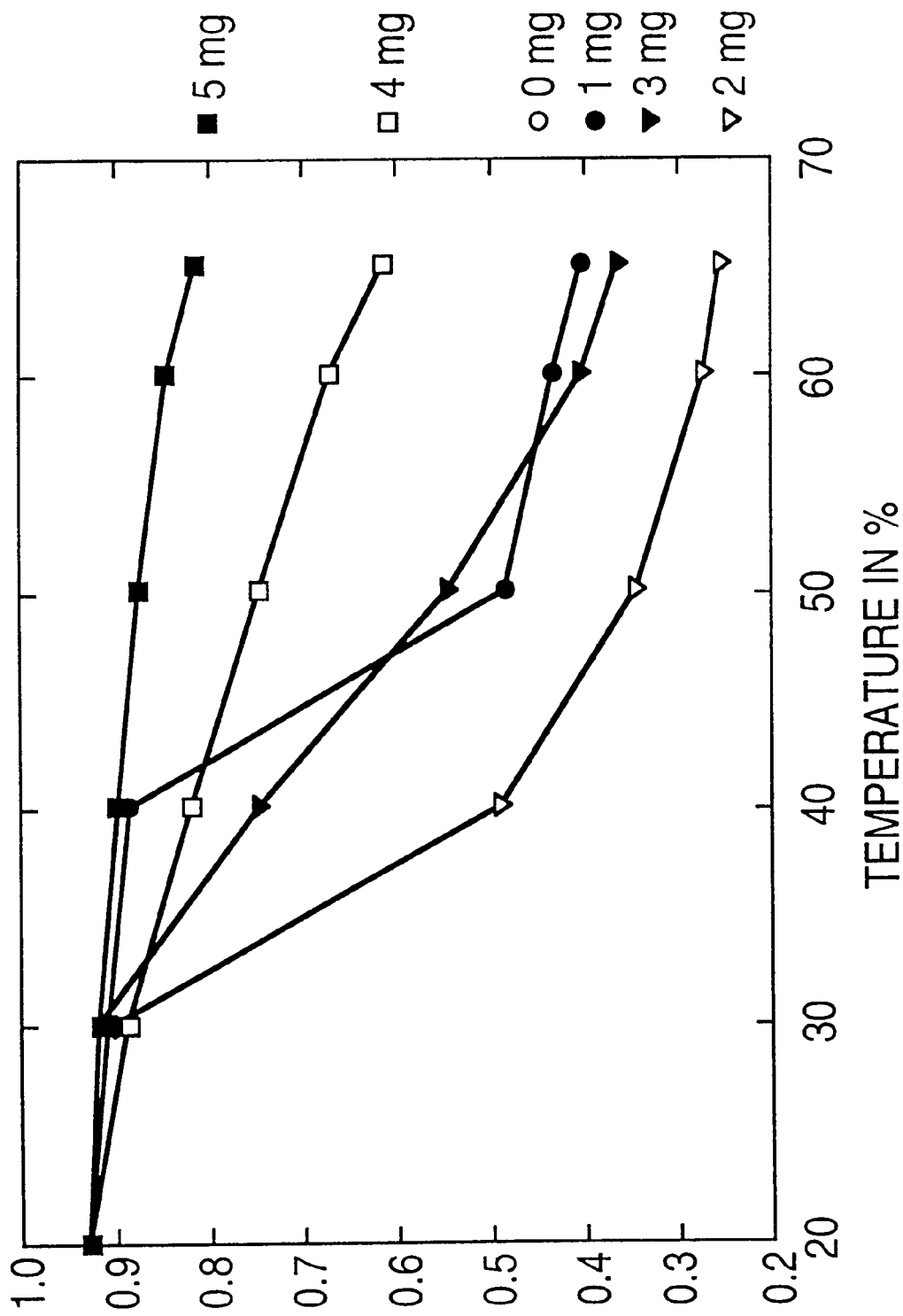
FIG. 3 is a diagram of light transmission as a function of temperature, of polymer mixtures having different amounts of cross-linking agent.

3. Several solutions each of 250 mg of a copolymer of styrene and hydroxyethyl methacrylate (Mw=120 000, HEMA con-tent: 5 mol %), 250 mg of Lupranol VP 9177 (trifunctional poly-propylene oxide, Mw=6000, 6% ethylene oxide content, BASF AG) and 1mg of 1,4-diazabicyclo(2,2, 2)octane are each made in 2 ml of toluene. To each of these solutions is added a different amount of Desmodur N 3300 and the individual mixtures are put in Petri dishes which have a diameter of 3 cm. After evaporation of a major part of the solvent at 200 mbar and 250° C., they are heated at 50 mbar to 40° C. for 24 hours. Yielded are films having at different temperatures the light transmission values shown in the diagram of FIG. 3 (measured with linear ray penetration of the samples and integration along the wavelength range of 400 nm to 800 nm).

At the right beside the curves are the amounts of Desmodur N 3300 per 500 mg of substance. One can see how an increasing amount of cross-linking agent first lower the demixing range to lower temperatures and still further increasing amounts of cross-linking component raise the demixing range to higher temperatures and simultaneously expand its breadth. This expansion is a result of lowering the phase size by means of larger amounts of cross-linking agent.

What is claimed is:

1. A material having temperature-dependant light transmission consisting essentially of a mixture of at least two compatible polymers, at least one of the polymers is a cross-linked polymer, wherein the polymers mix below a certain temperature and demix to separate into phases above said temperature, and wherein the light transmission through the material when the polymers are separated into phases is less than the light transmission through the material when the polymers are mixed.

2. The material according to claim 1, wherein at least one polymer is not cross-linked.

3. The material according to claim 1, wherein all polymers are cross-linked.

4. The material according to claim 1, wherein at least one polymer is at least partially grafted onto another polymer.

5. The material according to claim 1, wherein both components are polymerized before forming said mixture.

6. The material according to claim 1 wherein the material is clear when the mixture of at least two compatible polymers are mixed.

7. A material having temperature-dependant light transmission, comprising a final mixture of at least two components, at least one component being a cross-linked polymer and another component being a polymer, said final mixture being formed from an initial mixture having at least one monomeric component which is polymerized to form the final mixture, wherein the components in the final mixture mix below a certain temperature and demix to form phases above said temperature, wherein light transmission through the material when the polymers are demixed into phases is less than the light transmission through the material when the polymers are mixed.

8. The material according to claim 7, wherein said another component is not cross-linked.

9. The material according to claim 7, wherein both components are not polymerized before forming said mixture.

10. The material according to claim 7 wherein the final mixture of at least two components is clear when the at least two components are mixed.

11. The material according to claim 7, wherein at least one polymer is at least partially grafted onto another polymer.

12. The material according to claim 7, wherein all polymers are cross-linked.

* * * * *